(12) United States Patent
Ford et al.

(10) Patent No.: US 8,028,973 B2
(45) Date of Patent: Oct. 4, 2011

(54) ACTUATOR POSITION HOMING METHOD AND APPARATUS

(75) Inventors: Robert Ford, Troy, MI (US); Shawn Haley, Lake Orion, MI (US); Mark Woloszyk, Sterling Heights, MI (US); John Manfreda, Sterling Heights, MI (US)

(73) Assignee: Innovative Design Solutions, Troy, MI (US)

( * ) Notice: Subject to any disclaimer, the term of this patent is extended or adjusted under 35 U.S.C. 154(b) by 919 days.

(21) Appl. No.: 12/021,480

(22) Filed: Jan. 29, 2008

(65) Prior Publication Data
US 2009/0189558 A1 Jul. 30, 2009

(51) Int. Cl.
*B66F 7/00* (2006.01)
*B66F 7/20* (2006.01)
*B60S 9/00* (2006.01)

(52) U.S. Cl. ............ 254/89 R; 254/418; 280/6.15; 280/6.156; 187/203; 187/210

(58) Field of Classification Search .......... 318/432, 318/433, 436; 280/6.153, 6.15, 6.156; 254/418, 254/424; 180/41; 187/203, 204, 210, 212
See application file for complete search history.

(56) References Cited

U.S. PATENT DOCUMENTS

| | | |
|---|---|---|
| 3,606,247 A | 9/1971 | Liston |
| 3,943,637 A | 3/1976 | Hanser |
| 4,061,309 A | 12/1977 | Hanser et al. |
| 4,084,830 A | 4/1978 | Daniel, Jr. et al. |
| 4,148,125 A | 4/1979 | Hanser |
| 4,165,861 A | 8/1979 | Hanser |
| 4,380,258 A | 4/1983 | Hanser |
| 4,597,584 A | 7/1986 | Hanser |
| 4,655,269 A | 4/1987 | Hanser et al. |
| 4,743,037 A | 5/1988 | Hanser |
| 4,746,133 A | 5/1988 | Hanser et al. |
| 5,143,386 A | 9/1992 | Uriarte |
| 5,176,391 A | 1/1993 | Schneider et al. |
| 5,188,379 A | 2/1993 | Krause et al. |
| 5,511,459 A | 4/1996 | Hanser et al. |
| 5,547,040 A | 8/1996 | Hanser et al. |
| 5,628,521 A | 5/1997 | Schneider et al. |
| 5,676,385 A | 10/1997 | Schneider et al. |
| 5,772,270 A | 6/1998 | Hanser et al. |
| 5,890,721 A | 4/1999 | Schneider et al. |
| 5,901,969 A | 5/1999 | Schneider et al. |
| 5,908,215 A | 6/1999 | Hanser et al. |
| 5,913,525 A | 6/1999 | Schneider et al. |
| 6,050,573 A | 4/2000 | Kunz |
| 6,443,429 B1 * | 9/2002 | Hawk et al. ............ 254/90 |

(Continued)

*Primary Examiner* — Eduardo Colon-Santana
(74) *Attorney, Agent, or Firm* — Reising Ethington P.C.

(57) ABSTRACT

An electric actuator motor drives an actuator leg between inner and outer limits of an actuator stroke relative to an actuator base. A controller detects when the actuator leg is at one of the inner and outer stroke limits by monitoring and comparing actuator motor power draw to known actuator motor power draw values associated with the operation of an electric actuator when its leg has reached an actuator leg stroke limit. A position sensor senses changes in the position of a monitored actuator component and provides corresponding signals to the controller. The controller calculates the position of the monitored actuator component relative to the position that the monitored actuator component was in when the actuator leg was in a predetermined home position. The controller recognizes and records the concurrent position of the monitored actuator component as indicating that the actuator leg is in the home position whenever the leg reaches a stroke limit.

21 Claims, 5 Drawing Sheets

U.S. PATENT DOCUMENTS

| | | |
|---|---|---|
| 6,619,693 B1 * | 9/2003 | Sproatt et al. ............... 280/764.1 |
| 6,948,722 B2 * | 9/2005 | Sproatt et al. ............... 280/6.153 |
| 7,025,178 B2 * | 4/2006 | Wengelski et al. ............ 187/277 |
| 7,199,534 B2 * | 4/2007 | Ford et al. ........................ 318/98 |
| 7,219,770 B2 * | 5/2007 | Baker ............................ 187/247 |
| 7,281,608 B2 * | 10/2007 | Hansl et al. ................... 187/226 |
| 7,712,583 B2 * | 5/2010 | Matsumoto ................... 187/250 |
| 2004/0163894 A1 * | 8/2004 | Green et al. ................... 187/277 |
| 2004/0256815 A1 * | 12/2004 | Eichhorn et al. ............ 280/6.155 |
| 2005/0067227 A1 * | 3/2005 | Wengelski et al. ............ 187/285 |
| 2008/0021611 A1 * | 1/2008 | Hiebert et al. ................... 701/37 |
| 2009/0189134 A1 * | 7/2009 | Ford et al. ...................... 254/418 |
| 2010/0096819 A1 * | 4/2010 | Flynn et al. ................. 280/6.153 |

* cited by examiner

FIG. 6

ACTUATOR POSITION HOMING METHOD AND APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to an actuator such as an electric jack for adjusting the relative positions of adjacent structures.

2. Description of the Related Art Including Information Disclosed Under 37 CFR 1.97 and 1.98

Electro-mechanical actuators are used in a wide variety of commercial and industrial applications. Because they generally comprise simple linear actuators, such actuator systems can be integrated into mechanical systems for use in aligning or moving structures into desired positions relative to other structures or to applied forces or accelerations. One well known application of electro-mechanical actuator technology is the use of jack-type actuators to control the attitude or tilt of a rigid or semi-rigid platform, such as a recreational vehicle, relative to earth's gravity.

Figure 4:
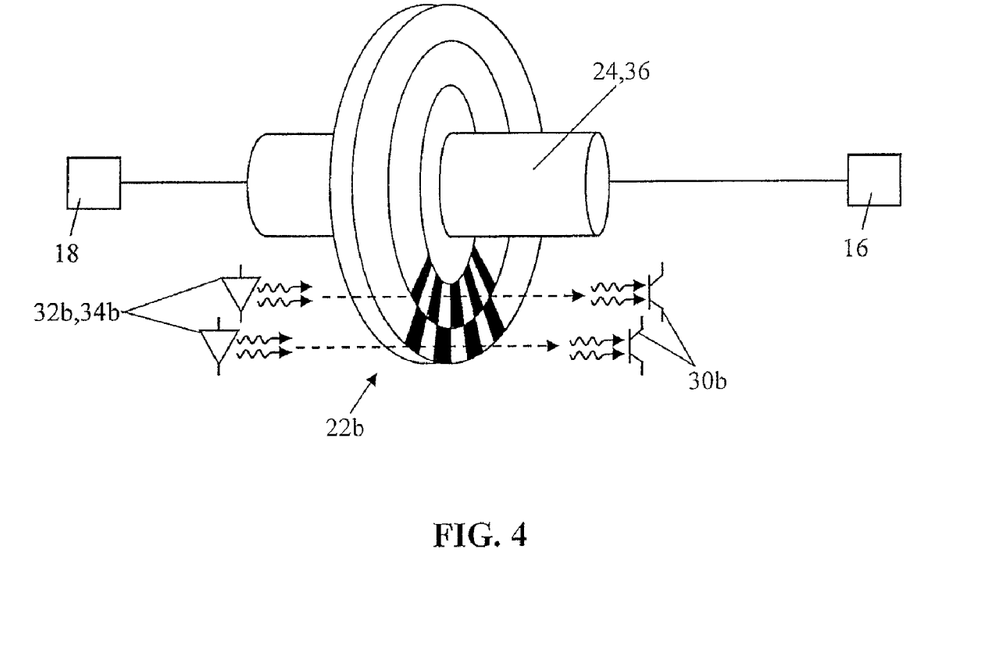
FIG. 4 is a schematic view of an optical encoder and LED photo emitters disposed adjacent a code disk supported on a rotating shaft component of a jack gearbox of the apparatus of FIG. 1.

Position sensing systems, such as optical encoders and Hall Effect sensors are also known to be useful in many commercial and industrial applications. As shown in FIG. 4, a typical optical encoder includes a rigid, opaque encoder ring that may be supported on a shaft or other structure whose rotation is to be monitored. The encoder ring has angularly-spaced holes or slots that allow light to pass through. With a light source, such as an LED photo emitter, positioned on one side of the encoder ring, and a light detector, such as a phototransistor photo detector, positioned on the other side, a detection circuit connected to and receiving signals from the photo detector can sense whenever encoder ring rotation causes a hole/slot pass between the photo emitter and the photo detector. Because the holes/slots are spaced at regular angular intervals, rotation of the encoder ring will cause the photo detector to sense a continuous series of light pulses or pulse train as the shaft is spinning. By counting the pulses in a pulse train, the detection circuit can directly track the rotation of the encoder ring and shaft and can infer the motion of other connected structures. Additionally; the frequency/period of the pulse train can be used to calculate shaft rotational speed.

Figure 3:
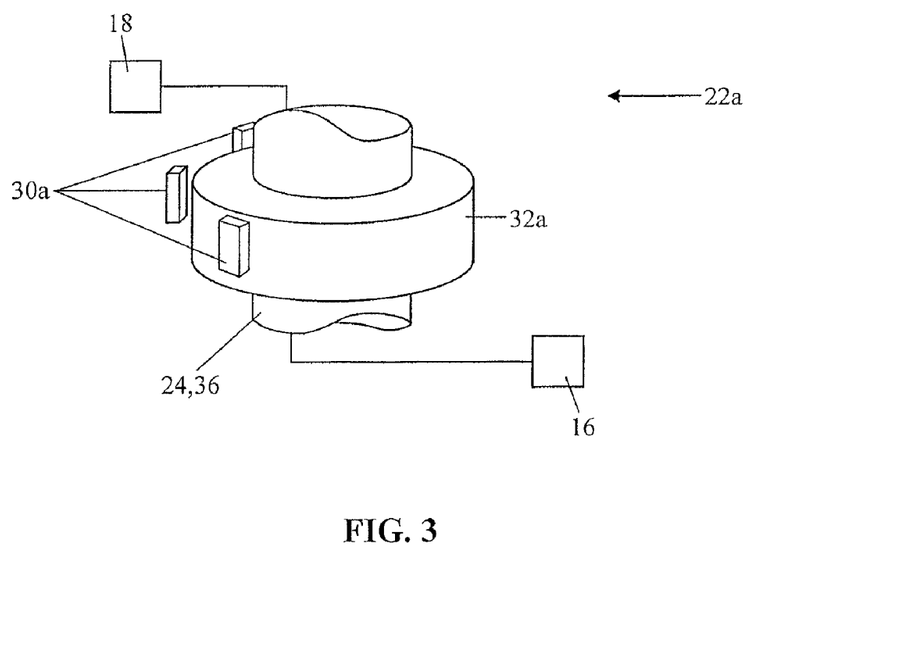
FIG. 3 is a schematic view of a magnet supported on a rotating shaft component of a jack gearbox of the apparatus of FIG. 1 and a Hall effect sensor supported adjacent the rotating component in a position to sense the rotation of the magnet.

As shown in FIG. 3, Hall Effect sensors are typically mounted in fixed locations circumferentially spaced from one another and radially equidistant from a rotor magnet in positions allowing them to track rotor magnet rotation by sensing the passage of magnetic poles of the rotor magnet. Alternatively, a single Hall Effect sensor may be mounted adjacent the circular path of an array of magnets circumferentially spaced around and supported on a rotatable disk or wheel. According to this arrangement the stationary Hall Effect sensor tracks disk rotation by sensing the passage of the magnets.

When a position sensor such as an optical encoder or Hall Effect sensor is employed, the position of a rotating structure such as a wheel or shaft can be accurately ascertained, and the position of a connected structure inferred, by counting pulses in the direction of rotation. As shown in action step 1 in the logic diagram of FIG. 5, a controller's perception of an initial starting position or "home" position of the rotating structure is defined by the pulse count of a software pulse counter when the rotating structure is in a "true" or "actual" initial starting or home position. Typically the pulse count is reset to a value of zero at this point. Whenever a pulse is subsequently received, it is then sensed whether rotation is clockwise or counter-clockwise as shown in decision steps 2, 3, and 4. If clockwise, the pulse counter is conventionally incremented as shown in action step 5. If sensed rotation is counter-clockwise, the pulse counter is conventionally decremented as shown in action step 6.

Figure 5:
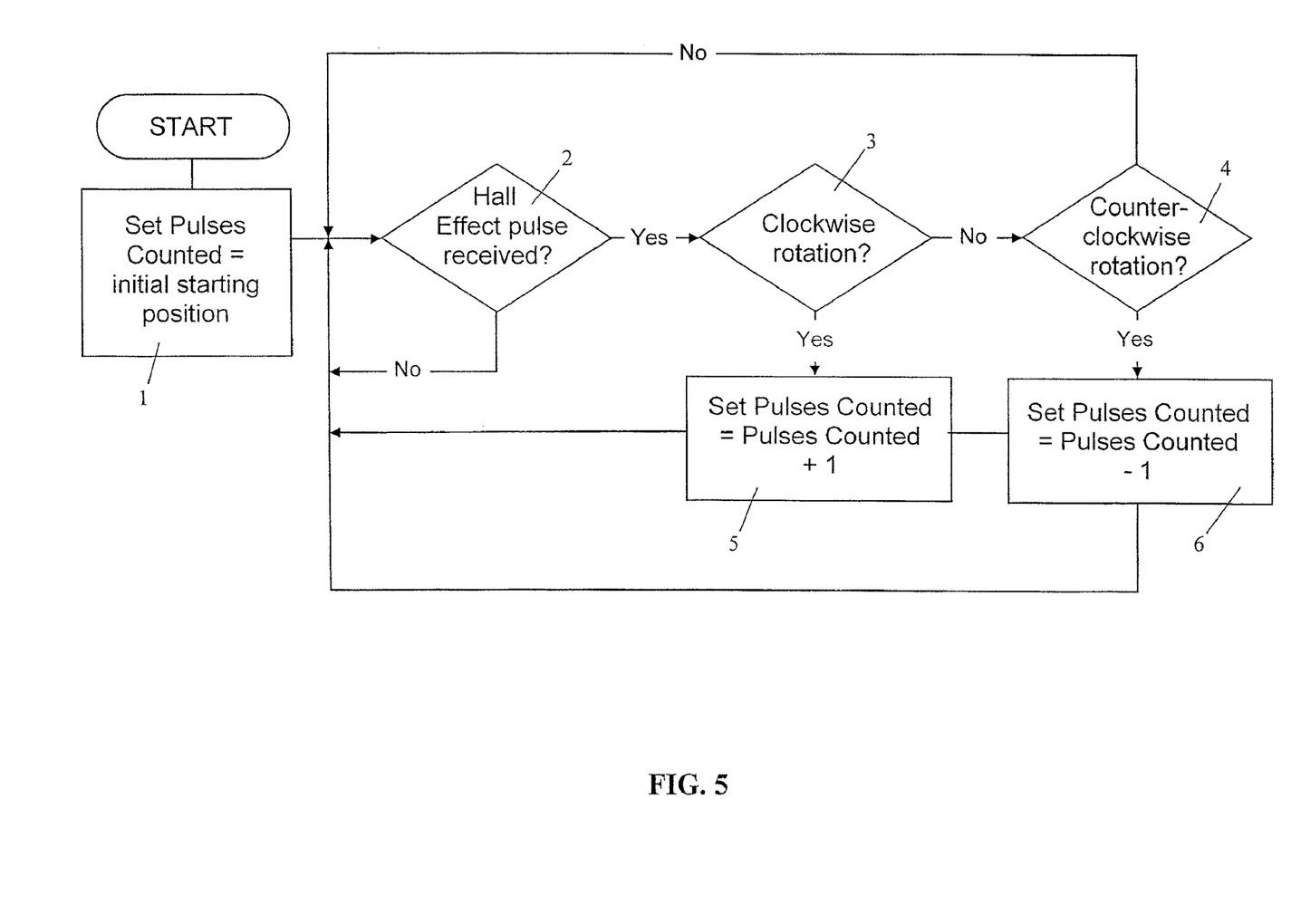
FIG. 5 is a flow chart depicting a logical process that may be used to track the changing position of the jack leg of the apparatus of FIG. 1.

Each pulse counted corresponds to a predetermined unit change in angular or rotational position of the shaft, as represented by the equation $ShaftRotation = K_{ShaftRotationAnglePerPulse} \times PulsesCounted$.

Where an actuator such as a jack includes a gearbox or other mechanical system that translates shaft rotation into linear extension/retraction of a leg portion of the jack, the position, or degree of extension of the jack leg may be precisely calculated by the following equation:

$$JackTranslation = K_{TranslationPerrotation} \times ShaftRotation$$

$$JackPosition = InitialStartingPosition + JackTranslation$$
$$= InitialStartingPosition +$$
$$(K_{TranslationPerrotation} \times ShaftRotation)$$

Accordingly, the total number of pulses counted is directly proportional to the distance the jack leg has traveled. The total number of pulses counted represents a position change or translation delta from a jack leg starting position that is unknown to a controller until the controller is "taught" what to consider as being the jack leg starting or "home" position. The homing of an actuator is a task generally performed by an operator before commencing operation of an actuator. Problematically, however, actuator controllers' perception of actual leg position tends to accumulate errors over time due to such factors as mechanical slippage and wear. It's therefore often necessary for an operator to periodically "re-home" an actuator to "remind" the controller as to the actual position of the actuator leg.

It would be desirable for an actuator such as a jack to be able to automatically determine or "learn" what actuator (jack leg) position to consider as being the actuator (jack leg) starting or "home" position so that operator input would not be required, and so that the actuator could occasionally re-home itself after the controller 20 has inevitably accumulated leg position perception errors.

BRIEF SUMMARY OF THE DISCLOSURE

A self-homing actuator apparatus is provided that comprises an actuator including an actuator leg supported for motion along a stroke relative to an actuator base. The apparatus also includes an electric actuator motor drivingly connected to the actuator leg and configured to drive the actuator leg between inner and outer limits of the stroke. A controller is configured to detect when the actuator leg is at one of the inner and outer leg stroke limits by monitoring and comparing motor power draw to known motor power draw values associated with the operation of an electric actuator motor when the actuator leg has reached an actuator leg stroke limit. A position sensor is connected to the controller and is configured to sense changes in the position of a monitored actuator component and to transmit corresponding position change signals to the controller. The controller is further configured to calculate the position of the monitored actuator component in response to position change signals received from the position sensor and relative to a home position of the monitored actuator component. The controller is also configured to recognize and record as the home position, the position of the monitored actuator component when the controller detects that the actuator leg has reached a stroke limit.

A method is provided for establishing a home position of an actuator for reference in subsequent actuator position calculations. The method includes providing an actuator including an actuator leg supported for motion relative to an actuator base, between inner and outer limits of an actuator leg stroke. Also provided is a position sensor configured to detect changes in the position of a monitored actuator component and to output corresponding position change signals. The actuator leg is moved to one of the stroke limits. The arrival of the actuator leg at the stroke limit is detected and the concurrent position of the monitored actuator component is identified as representing the home position of the actuator. The position of the monitored actuator component is calculated in response to position change signals received from the position sensor and relative to the monitored actuator component position identified as representing the home position of the actuator.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION OF INVENTION EMBODIMENT(S)

Figure 1:
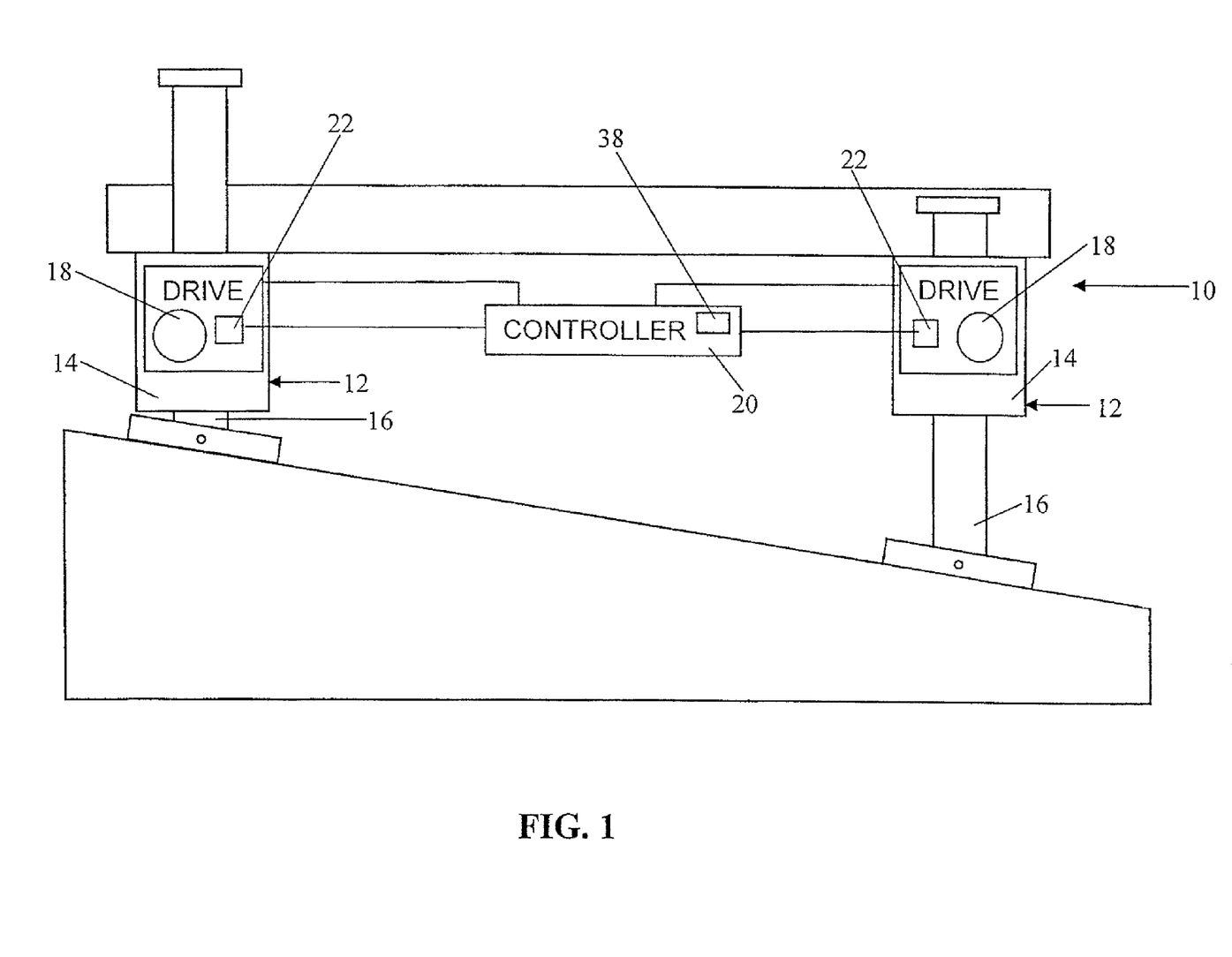
FIG. 1 is a schematic view of a self-homing actuator apparatus constructed according to the invention and including two actuators in the form of jacks supporting a platform in a level attitude over sloping ground.
Figure 2:
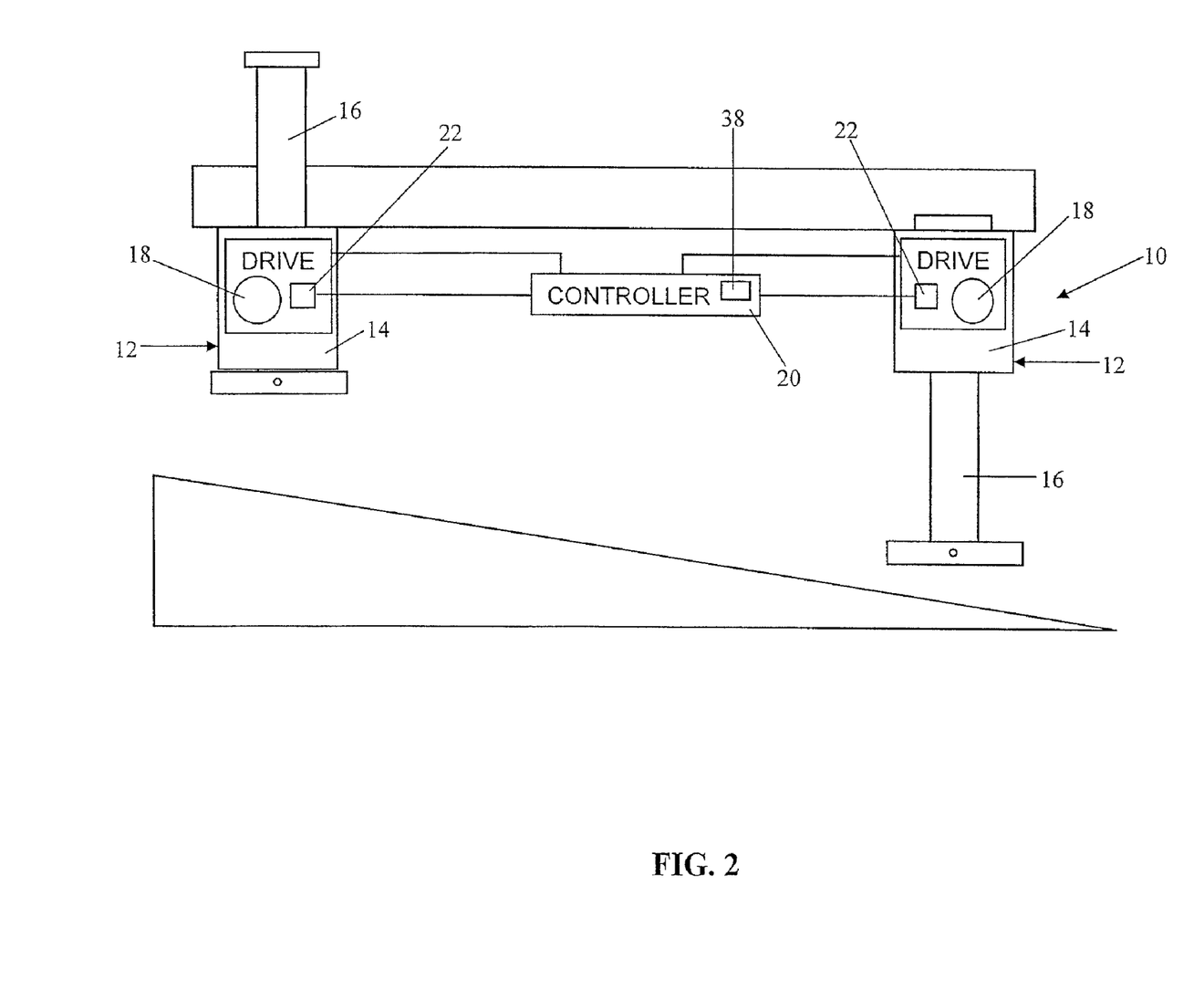
FIG. 2 is a partial schematic view of the self-homing actuator apparatus of FIG. 1 showing one jack of the apparatus with its leg in a home position, i.e., fully retracted to an inner stroke limit and one jack leg extended to a outer stroke limit.

A self-homing actuator apparatus is generally shown at 10 in FIGS. 1 and 2. The apparatus 10 may include an actuator 12 that has an actuator base 14 and an actuator leg 16 supported for motion along a stroke relative to the actuator base 14, and an electric actuator motor 18 that is drivingly connected to the actuator leg 16 and that drives the actuator leg 16 between inner and outer limits of the stroke. The actuator leg 16 is shown at the inner limit of the stroke in FIG. 1 and the outer limit of the stroke in FIG. 2.

The apparatus 10 may also include a controller 20 programmed to detect when the actuator leg 16 is at one of the inner and outer stroke limits. The controller 20 may be programmed to detect the arrival of an actuator leg 16 at one of the stroke limits by monitoring and comparing actuator motor power draw to known actuator motor power draw values associated with the operation of the electric actuator motor when the actuator leg 16 arrives at a stroke limit. The controller 20 may be programmed to monitor actuator motor power draw by, for example, monitoring actuator motor current draw at a predetermined voltage.

The apparatus 10 may also include a position sensor 22 connected to the controller 20. The position sensor 22 may be located where the sensor 22 can track changes in the position of a monitored actuator component 24 that is operably connected to the actuator leg 16 or whose motion otherwise corresponds to that of the actuator leg 16, and to then provide corresponding position change signals to the controller 20.

The controller 20 may further be programmed to calculate the position of the monitored actuator component 24 in response to position change signals received from the sensor 22. The controller 20 may use the position change signals from the sensor 22 to calculate changes in the position of the monitored component 24 relative to whatever position the controller previously determined that the monitored component 24 was in when the actuator leg 16 was in a position corresponding to a predetermined home position of the actuator. The controller 20 may be programmed to identify and record as the home position of the actuator, the position that the monitored actuator component 24 is in at the time that the controller detects that the actuator leg 16 has reached a stroke limit.

As shown in the drawings and as is further described below, the actuators 12 may be electric jacks, the actuator bases 14 may be jack bases, the actuator legs 16 may be jack legs, the actuator motors 18 may be electric jack motors, the monitored actuator component 24 may be a jack component, and the inner and outer actuator leg stroke limits may be upper and lower jack leg stroke limits, respectively. However, in other embodiments the actuators 12 and actuator components of the self-homing actuator apparatus may be any suitable type actuator and actuator components known in the art.

The controller 20 may be programmed to detect when a jack leg 16 has reached one of its inner and outer stroke limits by detecting jack motor stall, mechanical tightening in the jack 12, and/or clutching in a clutch connected between the jack motor 18 and the jack leg 16. Suitable jack stroke limit detection apparatti and methods are disclosed in U.S. Ser. No. 11/223,689 published as US-2006-0081420-A1 on Apr. 20, 2006, which is incorporated herein by reference in its entirety.

The controller 20 may be programmed to identify and record the home position of the jack as corresponding to the position of the monitored jack component 24 when the controller detects that the jack leg 16 has reached the inner (upper) one of the two stroke limits. As shown in FIGS. 3 and 4, the monitored jack component 24 may optionally be a drive component such as a gear or shaft that rotates at a rate proportional to the movement of the jack leg 16, is disposed in a jack gearbox 28, and is operably connected between the jack motor 18 and the jack leg 16.

As shown in FIGS. 3 and 4, the position sensor 22a, 22b may include a sensing element 30a, 30b and an emitter 32a, 32b; one of which may be supported for movement on the drive component 26 and the other of which may be supported in a stationary position adjacent the drive component 26. The emitter 32a, 32b may include one or more emission sources 34a, 34b. Where the emitter 32a, 32b includes a plurality of emission sources, the emission sources may be carried at circumferentially spaced locations on the monitored jack component 24. The sensing element 30a, 30b may then be supported adjacent a circular path that the emission sources 34a, 34b define when the monitored jack component 24 rotates (not shown).

As shown in FIG. 3, the sensing element 30 may include a plurality of Hall Effect sensors 30a and the emitter 32 may include a single emission source 32a in the form of a torroidal magnet supported on a rotatably supported shaft 36 in a position to sense the passage of magnetic poles of the magnet 32a. Suitable Hall effect sensors are well known in the art and are readily available from a variety of sources.

As shown in FIG. 4, the sensing elements 30 may, alternatively, be phototransistor photo detectors (optical sensors) 30b of an optical encoder 22b and the emission sources 34 may be light sources such as LED photo emitters 34b. The optical sensors 30b may be disposed opposite a code disk from the emission sources 34b, the code disk being supported for rotation with the shaft 36. Suitable optical encoders are also well known and readily available.

As shown in the logic diagram of FIG. 5, the controller 20 may be programmed to increment a software jack leg position counter 38 each time an emission source 34 passes the sensor 22 in a first direction, e.g., a clockwise rotational direction, and to decrement the jack leg position counter 38 each time an emission source 34 passes the sensor 22 in a second direction opposite the first direction, e.g., a counterclockwise rotational direction. As shown in the logic diagram of FIG. 6, the controller 20 may further be programmed to reset an incremental software jack leg position counter 38 to zero when the controller 20 detects that the jack leg has reached a stroke limit.

More specifically, a jack controller 20 may be taught the home position of a jack leg 16 for reference in subsequent jack position calculations by, as shown in FIGS. 3 and 4, first locating the position sensor 22 in a position where it can sense and track changes in the position of a drive component 26 or other rotating jack component that is operably connected between the jack motor 18 and the jack leg 16 and whose rotation is proportional to the motion of the jack leg 16. (In other embodiments the position sensor 22 could be positioned to sense changes in the position of the jack leg 16 itself or any jack component whose motion, rotational, linear, or otherwise, is proportional to that of the jack leg 16.) The jack motor 18 may then be actuated to drive the jack leg 16 toward one of the stroke limits. In the present embodiment, and as shown in action step 40, the jack motor 18 is actuated to retract the jack leg 16 toward the inner stroke limit and move the monitored jack component 24 in a first direction so that the jack controller 20 will learn to recognize the jack leg 16 as being in its home position when the jack leg 16 is at the inner one of the two stroke limits, i.e., the retracted position of the jack leg 16.

However, in other embodiments, the jack motor 18 may be actuated to extend the jack leg 16 toward the outer stroke limit and move the monitored jack component 24 in a second direction, opposite the first direction, so that the jack controller 20 will learn to recognize the jack leg 16 as being in its home position when the jack leg 16 is at the outer stroke limit, i.e., the extended position of the jack leg 16.

Figure 6:
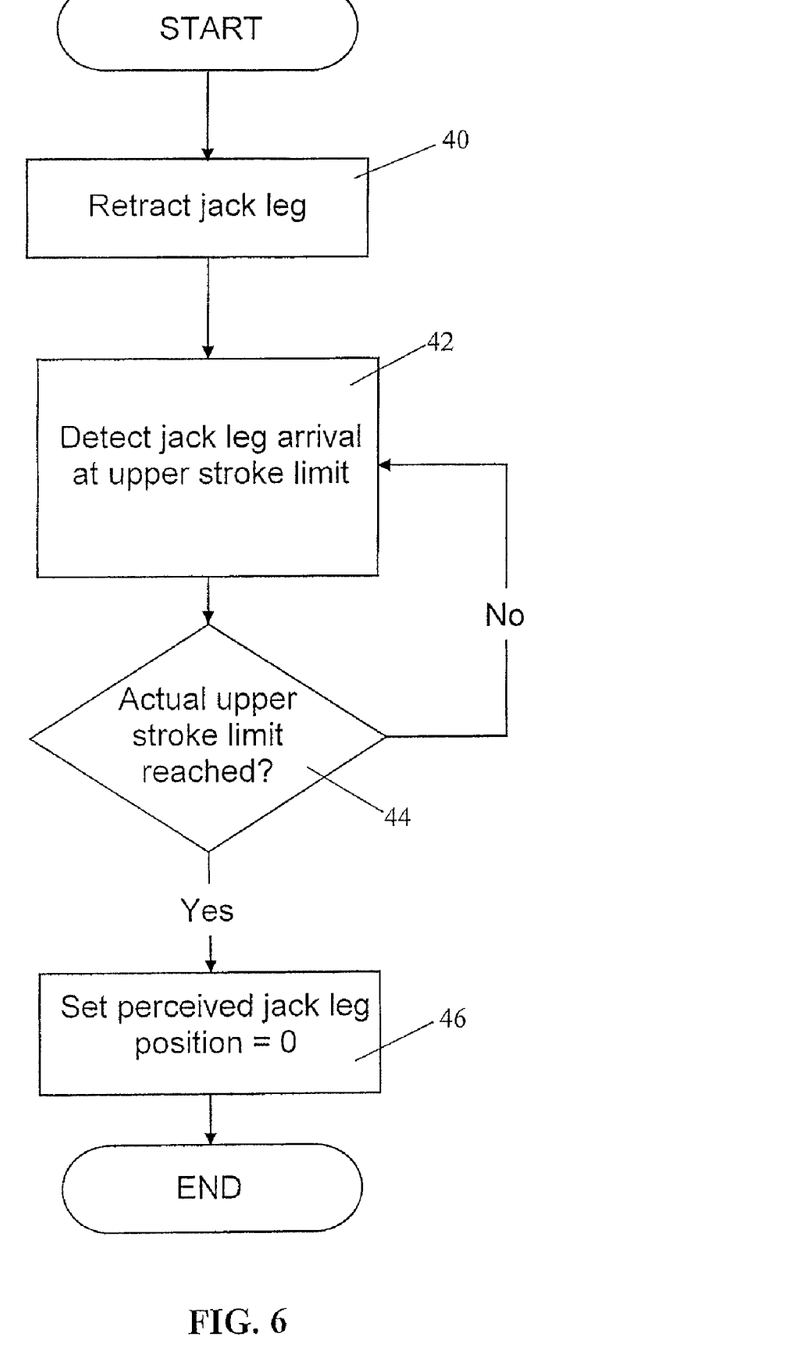
FIG. 6 is a flow chart depicting a logical process that may be used to first home the position sensor of the apparatus of FIG. 1 and to then track changes in the position of a jack leg of the apparatus of FIG. 1.

As shown at action step 42 and decision step 44 of FIG. 6, once it has detected the arrival of the jack leg 16 at the inner stroke limit, the controller 20 recognizes and records the concurrent position of the monitored jack component 24 as indicating or corresponding to the home position of the jack and as being the position from which the controller will calculate subsequent measurements of the monitored jack component 24.

To make subsequent measurements of the monitored jack component 24 and to track jack leg position, the controller 20 may increment the software jack leg position counter 38 each time the controller receives signals from the sensor 22 indicating that an emission source or magnetic pole has passed the sensor 22 in a first direction. Conversely, the controller 20 may decrement the jack leg position counter 38 each time the controller receives signals from the sensor 22 indicating that an emission source 34 or magnetic pole has passed the sensor 22 in a second direction opposite the first direction as shown in FIG. 5. As shown in action step 46 of FIG. 6, the controller 20 may record its recognition of the concurrent position of the monitored jack component 24 as indicating the home position of the jack leg 16 by resetting the incremental software jack leg position counter 38 to zero.

The point at which the jack leg 16 reaches one of the inner and outer stroke limits may be detected by monitoring and comparing jack motor power draw to known jack motor power draw values associated with the operation of an electric jack 12 has reached a jack stroke limit. The power draw values could be those associated with, for example, jack motor stall, mechanical tightening in the jack 12, and/or clutching in a clutch connected between the jack motor 18 and the jack leg 16 as disclosed in U.S. patent application Ser. No. 11/223,689 published as US-2006-0081420-A1 on Apr. 20, 2006, which is incorporated herein by reference.

A jack homing method and apparatus, executed or constructed according to the above description, may be used to automatically teach a controller 20 the home position of a jack leg 16 whenever the jack leg 16 is moved to a stroke limit. This obviates the initial operator intervention that would otherwise be necessary to initially home the system, and obviates any subsequent need for an operator to periodically intervene to re-home the system after the jack controller 20 has accumulated leg position perception errors.

This description, rather than describing limitations of an invention, only illustrates (an) embodiment(s) of the invention recited in the claims. The language of this description is therefore exclusively descriptive and is non-limiting.

Obviously, it's possible to modify this invention from what the description teaches. Within the scope of the claims, one may practice the invention other than as described above.

What is claimed is:

1. A self-homing actuator apparatus comprising:
   an actuator including an actuator leg supported for motion along a stroke relative to an actuator base, and also including an electric actuator motor drivingly connected to the actuator leg and configured to drive the actuator leg between inner and outer limits of the stroke;
   a controller configured to detect when the actuator leg is at one of the inner and outer leg stroke limits by monitoring and comparing motor power draw to known motor power draw values associated with the operation of an electric actuator motor when the actuator leg has reached an actuator leg stroke limit; and
   a position sensor connected to the controller and configured to sense changes in the position of a monitored actuator component and to transmit corresponding position change signals to the controller, the controller being further configured to calculate the position of the monitored actuator component in response to position change signals received from the position sensor and relative to a home position of the monitored actuator component, the controller being further configured to recognize and record as the home position, the position of the monitored actuator component when the controller detects that the actuator leg has reached a stroke limit.

2. A self-homing actuator apparatus as defined in claim 1 in which the controller is configured to detect when the actuator leg has reached one of the inner and outer stroke limits by detecting any one or more phenomena selected from the group consisting of: actuator motor stall, mechanical tightening in the actuator, and clutching in a clutch connected between the actuator motor and the actuator leg.

3. A self-homing actuator apparatus as defined in claim 1 in which the controller is programmed to recognize and record as the home position, the position of the monitored actuator component when the controller detects that the actuator leg has reached the inner stroke limit.

4. A self-homing actuator apparatus as defined in claim 1 in which the controller is configured to monitor actuator motor power draw by monitoring actuator motor current draw at a predetermined voltage.

5. A self-homing actuator apparatus as defined in claim 1 in which the position sensor is positioned and configured to sense changes in the position of a drive component that moves at a rate proportional to the movement of the actuator leg.

6. A self-homing actuator apparatus as defined in claim 5 in which the position sensor includes a sensing element and an emitter, one of which is supported for movement on the drive component and the other of which is supported in a stationary position adjacent the drive component.

7. A self-homing actuator apparatus as defined in claim 6 in which the emitter includes a plurality of emission sources carried at spaced locations on the drive component and the sensing element is supported adjacent a path that the emission sources define when the drive component moves.

8. A self-homing actuator apparatus as defined in claim 7 in which the sensing element is a Hall Effect sensor and the emission sources are the magnetic poles of a rotor magnet.

9. A self-homing actuator apparatus as defined in claim 7 in which the controller is configured to:
reset an incremental software jack leg position counter to zero when sensing that a stroke limit has been reached;
increment the counter each time an emission source passes the sensor in a first direction; and
decrement the counter each time an emission source passes the sensor in a second direction opposite the first direction.

10. A self-homing actuator apparatus as defined in claim 5 in which the position sensor includes an optical sensor and a light source disposed on opposite sides of a code disk supported for rotation with the drive component.

11. A method for establishing a home position of an actuator for reference in subsequent actuator position calculations, the method including the steps of:
providing an actuator including an actuator leg supported for motion relative to an actuator base, between inner and outer limits of an actuator leg stroke;
providing a position sensor configured to detect changes in the position of a monitored actuator component and to output corresponding position change signals;
moving the actuator leg to one of the stroke limits;
detecting the arrival of the actuator leg at the stroke limit and identifying the concurrent position of the monitored actuator component as representing the home position of the actuator; and
calculating the position of the monitored actuator component in response to position change signals received from the position sensor and relative to the monitored actuator component position identified as representing the home position of the actuator.

12. The method of claim 11 in which the step of providing a position sensor includes disposing the position sensor in a position to sense changes in the position of a drive component that is operably connected to the actuator leg and whose motion is proportional to the motion of the actuator leg.

13. The method of claim 12 in which the step of providing a position sensor includes providing a position sensor that includes a sensing element and an emitter, one supported on the drive component and the other adjacent the drive component.

14. The method of claim 13 in which the step of providing a position sensor includes providing an emitter that includes a plurality of emission sources carried at spaced locations on the drive component.

15. The method of claim 14 in which the step of providing a position sensor includes providing a Hall effect sensor.

16. The method of claim 14 in which the step of providing a position sensor includes providing an optical sensor.

17. The method of claim 14 in which:
the step of calculating the position of the monitored actuator component includes:
incrementing a position counter each time a position change signal is received indicating that an emission source has passed the position sensor in a first direction; and
decrementing the position counter each time a position change signal is received indicating that an emission source has passed the position sensor in a second direction opposite the first direction; and
the step of detecting the arrival of the actuator leg at the stroke limit and identifying the concurrent position of the monitored actuator component as representing the home position of the actuator includes resetting the position counter.

18. The method of claim 11 in which:
the step of providing an actuator includes providing an electric actuator motor drivingly connected to the actuator leg and configured to drive the actuator leg between the inner and outer stroke limits; and
the step of detecting the arrival of the actuator leg at the stroke limit includes monitoring and comparing actuator motor power draw to known actuator motor power draw values associated with the operation of an electric actuator motor when an actuator leg has reached an actuator stroke limit.

19. The method of claim 18 in which the step of detecting the arrival of the actuator leg at the stroke limit includes detecting any one or more phenomena selected from the group consisting of: actuator motor stall, mechanical tightening in the actuator, and clutching in a clutch connected between the actuator motor and the actuator leg.

20. The method of claim 11 in which:
the step of providing an actuator includes providing an electric actuator motor drivingly connected to the actuator leg and configured to drive the actuator leg between the inner and outer stroke limits; and
the method includes the additional step of actuating the motor to retract the actuator leg toward the inner stroke limit such that the home position is identified as corresponding to the position of the monitored actuator component when the actuator leg is at the inner stroke limit.

21. The method of claim 11 in which the step of moving the actuator leg includes moving the actuator leg toward the inner stroke limit such that the home position is identified as corresponding to the position of the monitored actuator component when the actuator leg has reached the inner stroke limit.

\* \* \* \* \*